US006694322B2

United States Patent
Warren et al.

(10) Patent No.: US 6,694,322 B2
(45) Date of Patent: Feb. 17, 2004

(54) CACHING SCHEME FOR MULTI-DIMENSIONAL DATA

(75) Inventors: Christina E. Warren, San Jose, CA (US); Galt Johnson, Mountain View, CA (US)

(73) Assignee: AlphaBlox Corporation, Mountain View, CA (US)

( * ) Notice: Subject to any disclaimer, the term of this patent is extended or adjusted under 35 U.S.C. 154(b) by 188 days.

(21) Appl. No.: 09/896,145

(22) Filed: Jun. 29, 2001

(65) Prior Publication Data

US 2002/0126545 A1 Sep. 12, 2002

Related U.S. Application Data

(60) Provisional application No. 60/215,699, filed on Jun. 29, 2000.

(51) Int. Cl.[7] .................................. G06F 17/30
(52) U.S. Cl. ........................ 707/101; 707/102
(58) Field of Search .......................... 707/101, 100, 707/102, 1, 103, 202; 711/3, 127; 74/441

(56) References Cited

U.S. PATENT DOCUMENTS

| | | | | |
|---|---|---|---|---|
| 5,749,089 A | * | 5/1998 | Yoshizawa et al. | 711/127 |
| 5,778,408 A | * | 7/1998 | Valentine | 711/3 |
| 5,918,232 A | * | 6/1999 | Pouschine et al. | 707/103 R |
| 5,987,467 A | | 11/1999 | Ross et al. | |
| 6,041,671 A | * | 3/2000 | Erikson et al. | 74/441 |
| 6,073,139 A | | 6/2000 | Jain et al. | |
| 6,477,536 B1 | * | 11/2002 | Pasumansky et al. | 707/102 |
| 6,493,718 B1 | * | 12/2002 | Petculescu et al. | 707/102 |
| 6,493,728 B1 | * | 12/2002 | Berger | 707/202 |
| 6,546,395 B1 | * | 4/2003 | DeKimpe et al. | 707/1 |
| 6,549,907 B1 | * | 4/2003 | Fayyad et al. | 707/101 |

OTHER PUBLICATIONS

International Search Report dated Dec. 17, 2002 for International Application No. PCT/US01/20817, filed on Dec. 27, 2002.

\* cited by examiner

*Primary Examiner*—Sanjiv Shah
(74) *Attorney, Agent, or Firm*—Fenwick & West LLP

(57) ABSTRACT

A system, method, and a computer program product for caching multi-dimensional data based on an assumption of locality of reference. A user sends a query for data. A described compilation module converts the query into a set of cubelet addresses and canonical addresses. In the described embodiment, if the data corresponding to the cubelet address is found in a data cache, the data cache returns the cubelet, which may contain the requested data and data for "nearby" cells. The data corresponding to the canonical addresses is extracted from the returned cubelet. If the data is not found in a data cache, a fault handler queries a back-end database for the cubelet identified by the cubelet address. This cubelet includes the requested data and data for "nearby" cells. The requested data and the data for "nearby cells" are in the form of values of measure attributes and associated canonical addresses. The returned cubelet is then cached and the data corresponding to the canonical addresses is extracted.

12 Claims, 11 Drawing Sheets

| Loc | | | Time | | | | | | | | | | | | |
|---|---|---|---|---|---|---|---|---|---|---|---|---|---|---|---|
| | | | 1999 | | | | | | 2000 | | | | | | |
| | | | Jan | Feb | May | Sept | Nov | Dec | Jan | Mar | July | Oct | Dec | | |
| US | West | CA | 4 | 1 | 2 | 3 | 4 | 3 | 2 | 3 | 2 | 2 | 2 | | |
| | | NM | 2 | 5 | 7 | 2 | 4 | 4 | 5 | 2 | 5 | 7 | 7 | | |
| | East | NY | x | x | x | 1 | x | x | x | 1 | x | x | x | | |
| | | NH | 1 | 2 | 2 | 1 | 2 | 1 | 2 | 1 | 2 | 2 | 2 | | |
| | Midwest | IL | 5 | 5 | 5 | 6 | 6 | 7 | 6 | 7 | 7 | 8 | 9 | | |
| | | OK | 3 | 4 | 4 | 5 | 5 | 6 | 7 | 7 | 7 | 8 | 9 | | |

FIG. 5A

<time.1999.*, loc.us.west.*, product.sp.happy soap>

<time.2000.*, loc.us.west.*, product.sp.happy soap>

<time.1999.*, loc.us.midwest.*, product.sp.happy soap>

<time.2000.*, loc.us.midwest.*, product.sp.happy soap>

| | | Time | |
|---|---|---|---|
| | | 1999 | 2000 |
| West | CA | 17 | 11 |
| | NM | 24 | 26 |
| East | NY | 1 | 1 |
| | NH | 9 | 9 |
| Midwest | IL | 34 | 37 |
| | OK | 27 | 38 |

West cells: <time.*,loc.us.west.*, product.sp.happy soap>

East cells: <time.*,loc.us.east.*, product.sp.happy soap>

Midwest cells: <time.*,loc.us.midwest.*, product.sp.happy soap>

Loc: US

FIG. 5D

CACHING SCHEME FOR MULTI-DIMENSIONAL DATA

RELATED APPLICATIONS

This application claims priority under 35 U.S.C. §119(e) to U.S. Provisional Application No. 60/215,699, filed Jun. 29, 2000, and entitled "Caching Scheme for Multi-Dimensional Data," which is incorporated by reference herein in its entirety.

BACKGROUND

1. Technical Field

The present invention relates generally to memory access and, more specifically, to a method and system for caching multi-dimensional data.

2. Background of the Invention

Relational databases usually include a plurality of tables that are searched ("queried") using a well-known query language, such as the Structured Query Language (SQL). Relational databases, however, do not allow a user to selectively extract and view data from different points of view. To organize and summarize data for efficient analytical querying, a concept of a cube is used.

A cube contains one or more dimensions and one or more measures. Measures are central values in a cube that are analyzed, such as sales, profit, costs of goods sold or inventory count. A cube provides a logical, easily understood mechanism for querying data. A cube allows a user to extract and view data from different points of view. Dimension levels are a powerful tool, allowing users to ask questions at a high level and then expand a dimension hierarchy to reveal more details. Using a drill down/drill up technique a user may navigate through levels of data ranging from the most summarized (up) to the most detailed (down).

When a user requests data from one area of a cube, he will probably also be interested in viewing data that clusters around that area of the cube. To retrieve such data, however, a number of individual queries need to be submitted to a database. Conventional caching approaches allow for caching each database address and a value corresponding to a measure attribute. Such an approach works acceptably well with cubes having a small number of dimensions. However, the number of possible stored measures grows exponentially in cubes with a large number of dimensions. Therefore querying and caching each pair—an address and a value corresponding to a measure attribute—results in a large number of single measure queries against the database.

What is needed is a way to increase the efficiency of data access in a database.

SUMMARY OF THE INVENTION

A described embodiment of the present invention provides a system, method, and a computer program product for caching multi-dimensional data in a data cache. The described embodiment uses a known a multi-dimensional construct, a cube, to represent the dimensions of data available to a user. This construct may have one or more dimensions. When the user submits a query or request for data, the request is converted to a set of canonical addresses and a set of cubelet addresses corresponding to their location in the cube. The described embodiment defines a region of related data in a cube to be a cubelet. A cubelet is a collection of values of a corresponding measure attribute and their associated canonical addresses. A cubelet address is the unique name for a cubelet that both uniquely identifies the cubelet, and identifies its location in the cube. A canonical address is the address of a single cell in the cube, and uniquely identifies one set of measures in the cube.

In a described embodiment, an execution module probes a data cache based on a cubelet address to determine if that portion of the cube has previously been cached. If so, the data cache returns the cubelet, which may contain more data than requested in the query. The execution module then probes the cubelet for the requested data and returns the requested data to the user. If the cubelet identified by the cubelet address is not found in the data cache, a fault handler queries a back-end database for data. The database returns a result set, which includes the requested data and the data for "nearby cells." The returned data is stored in the data cache in the form of a cubelet. Different cubelets may represent different levels of data in the database.

BRIEF DESCRIPTION OF THE DRAWINGS

FIGS. 5A–5D are block diagrams of a set of cubelets stored in a data cache in accordance with a described embodiment of the present invention.

DETAILED DESCRIPTION OF PREFERRED EMBODIMENTS

Figure 1:
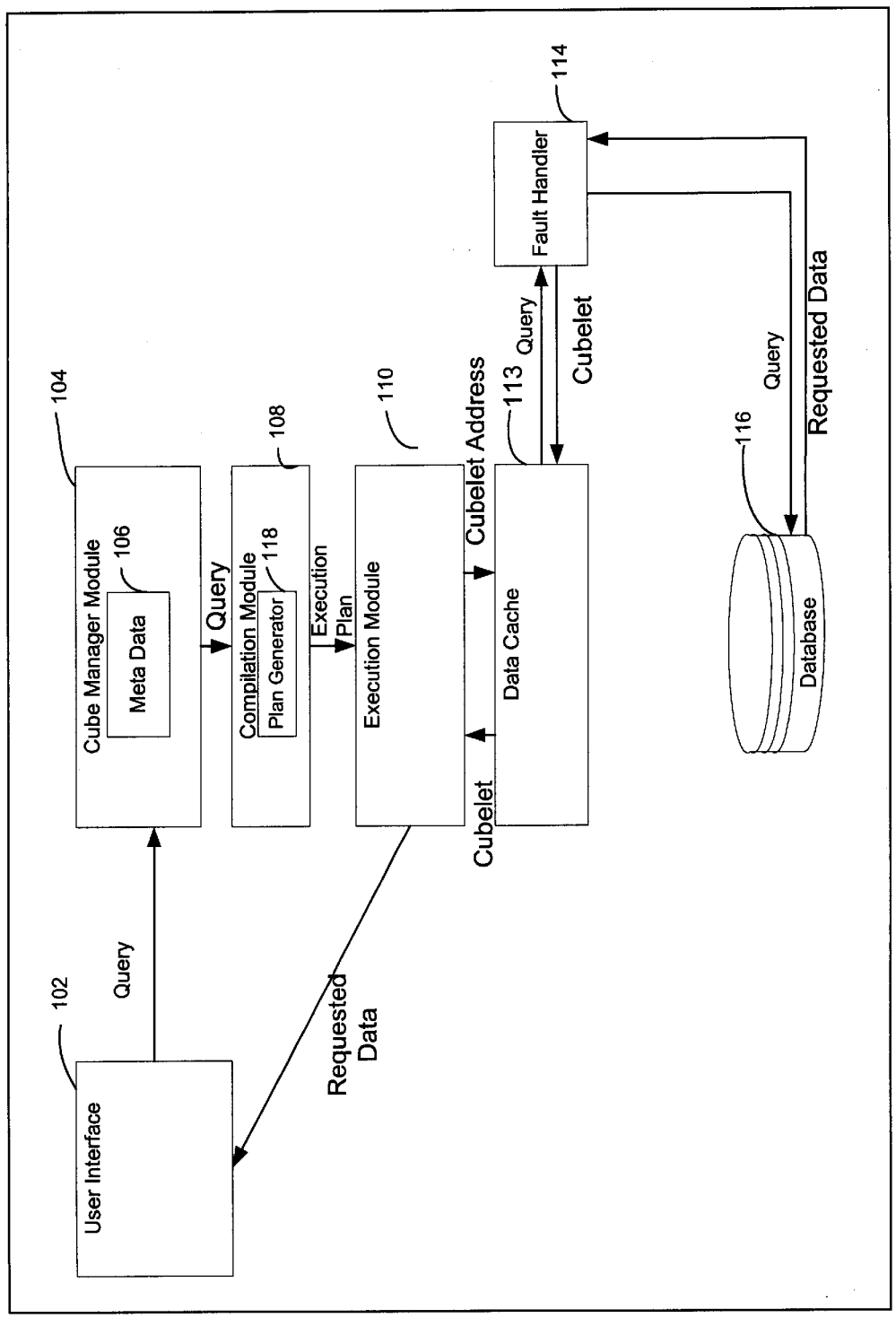
FIG. 1 is a block diagram illustrating an overall architecture in accordance with a described embodiment of the present invention.

FIG. 1 is a block diagram illustrating an overall architecture of a system 100 for caching multi-dimensional data in accordance with a described embodiment of the present invention. System 100 includes, but is not limited to, a user interface 102, a cube manager module 104, a meta data structure 106, a compilation module 108, an execution module 110, a data cache 113, a fault handler 114, a database 116, and a plan generator 118.

The cube manager module 104 manages all the resources and provides internal information to other components. A meta data structure 106 is embedded in the cube manager module 104. The meta data structure 106 has data for all the dimensions in the cube, and there is always at least one dimension. The meta data structure 106 is described in more detail below in connection with FIGS. 3 and 4.

The cube manager module 104 receives a query from a user through the user interface 102 and forwards the query to the compilation module 108. The compilation module 108 in this embodiment supports a subset of the Multi-Dimensional Expression Language (MDX) developed by Microsoft. The compilation module 108 includes a parser (not shown) for processing a string to determine if the query is a valid MDX string. The parser is written using the product JavaCC, available from MetaMata. The compilation module 108 further includes the plan generator 118. The plan generator 118 breaks the multi-dimensional query into probes into the multi-dimensional space. The plan generator 118 also computes a set of addresses and generates an execution plan containing these addresses. The compilation module 108 outputs the execution plan to the execution module 110. The execution module 110 takes the execution plan and executes it against the data cache 113. The data cache 113 manages the in-memory storage of query results and represents a two-level hash table. The data cache 113 is described below in more detail in connection with FIG. 6.

System 100 further includes the database 116 for storing data. It should be noted that database 116 can be any data store, such as a relational database, multi-dimensional database, flat file, etc. and can have any number of dimensions and levels. In the preferred embodiment of the present invention, database 116 is a relational database. System 100 supports a known Star schema in the database 116. System 100 further includes the fault handler 114 for querying the relational database 116 if the requested data is not present in the data cache 113.

The following paragraphs show an example database 116 and how data cache 113 operates in conjunction with the database 116.

Figure 2A:
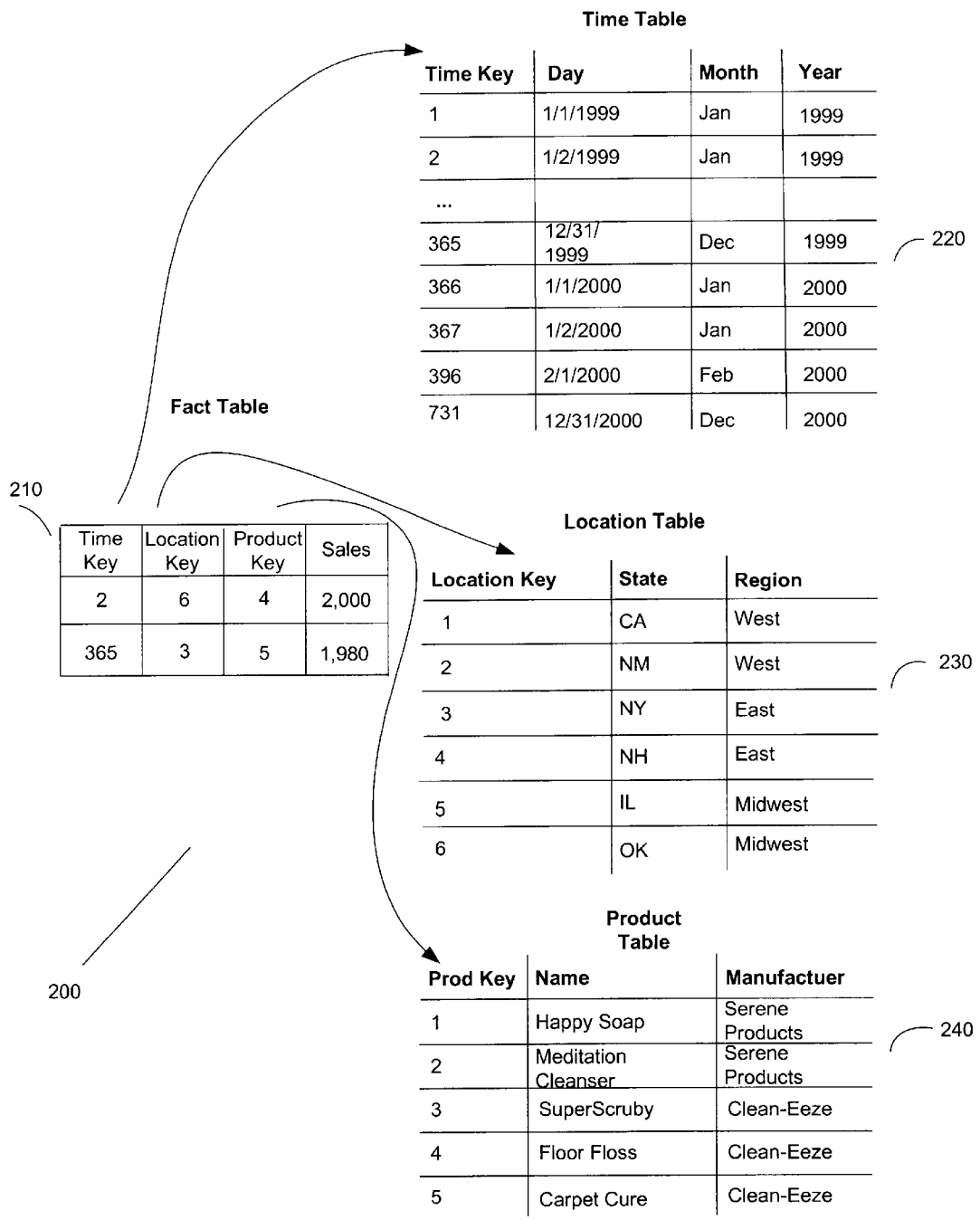
FIG. 2A illustrates a supported relational schema in accordance with an embodiment of the present invention.

FIG. 2A illustrates an example of a supported schema 200 in the database 116. Schema 200, which is an instance of a Star schema, is a data source from which a cube derives its measures and dimensions. The schema 200 represents a set of tables that store the measures and their related dimensions. The schema 200 includes the following tables: Fact table 210, Time table 220, Location table 230, and Product table 240. The Fact table 210 stores the measures and identifiers that relate the measures back to the dimensions. Each dimension is related via a primary-key/foreign-key relationship to the fact table. Different levels in a dimension may be denormalized or normalized in this embodiment. In this example, the levels are all denormalized.

Time table 220 has four columns: time_key, Day, Month and Year. Each row contains a time_key, which is a value in the Time table 220 that uniquely identifies one row in that table. Each cube dimension may include a hierarchy of levels to specify the categorical breakdown available to users. In the Time table 220, Year, Month and Day represent three different levels in the hierarchy in the time dimension, from the least detailed to the most detailed. The time dimension hierarchy is discussed in more detail in connection with FIG. 3.

The Location table 230 has three columns: location_key, State and Region. The location_key uniquely identifies exactly one row in the Location table 230. Each row contains the state and region each location_key represents. In one embodiment of the present invention, Location table 230 stores data for CA and NM for the Western Region, for NY and NH for the Eastern Region, and for IL and OK for the Midwestern Region. In the Location table 230, Region and State represent two different levels in the hierarchy in the location dimension, from the least detailed to the most detailed. The Location dimension hierarchy is discussed in more detail in connection with FIG. 4.

The Product table 240 has three columns: product_key, Name, and Manufacturer. The product_key uniquely identifies one row in the Product table 240. Each row contains the name and manufacturer each product_key represents. In one embodiment of the present invention, the Product table 240 stores the following products: Happy Soap and Meditation Cleanser manufactured by Serene Products (SP). Product table 240 also stores Super Scruby, Floor Floss, and Carpet Cure manufactured by Clean-Eeez. In the Product table 240, Name and Manufacturer represent two different levels in the hierarchy in the product dimension, from the most detailed to the least detailed. In the Product table 240 it is assumed that one product is manufactured by exactly one manufacturer.

The Fact table 210 is the central table in the schema 200. Columns in the Fact table 210 reference the primary keys, time_key, location_key, and prod_key of the related dimension tables 220, 230, and 240, and it also contains the measures. In the shown Fact table 210 there is only one measure, Sales. The first row in the Fact table 210 is: time_key=2, location_key=6, prod_key=4, Sales=$2,000. The second row is: time_key=365, location_key=3, prod_key=5, Sales=$1,980. The first row in the Fact table 210 indicates that on Jan. 2, 1999 (time_key=2), in Oklahoma (location_key=6), for Floor Floss (prod_key=4) there were sales of $2,000. Similarly, data in the second row indicates that on Dec. 31, 1999 (time_key=365) in New York (location_key=3), for Carpet Cure (prod_key=5) there were sales of $1,980.

Thus, the Fact table 210 contains data at the lowest level (Day), but a user may want to query the data in the Fact table 210 at different levels. For example, the user might be interested in looking at an aggregation (e.g., sum, average, etc.) of the data by month instead of looking at all 365 days in the year. Further, the user might be interested in asking for data aggregated at the Region level. It should be noted that the Fact table 210 may contain any number of rows, and are usually quite large, often running into the billions of rows.

Figure 2B:
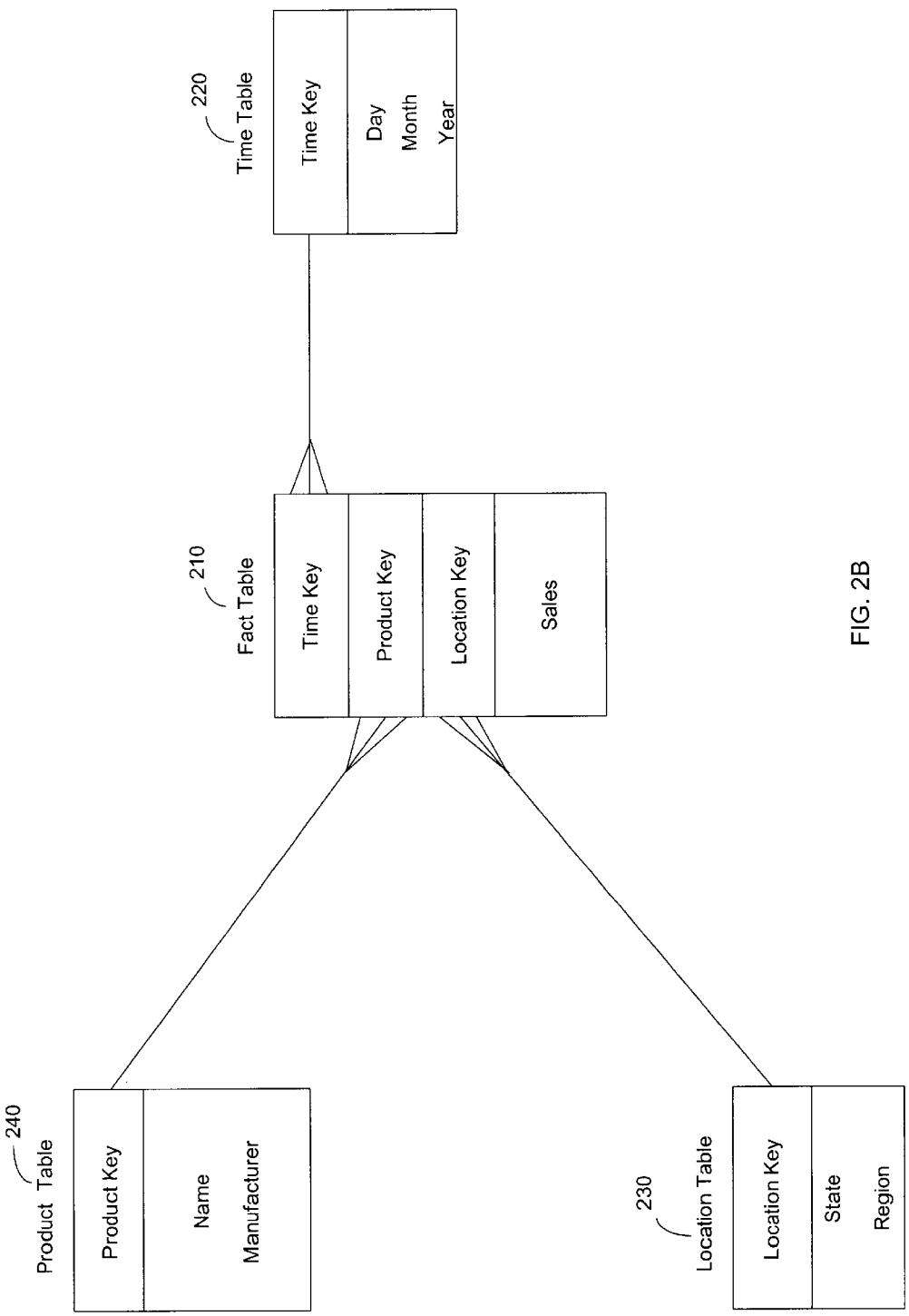
FIG. 2B illustrates dimension tables joined to a fact table in the embodiment of FIG. 2A.

FIG. 2B illustrates dimension tables 220, 230, and 240 joined to the Fact table 210 in the supported schema 200.

Figure 2C:
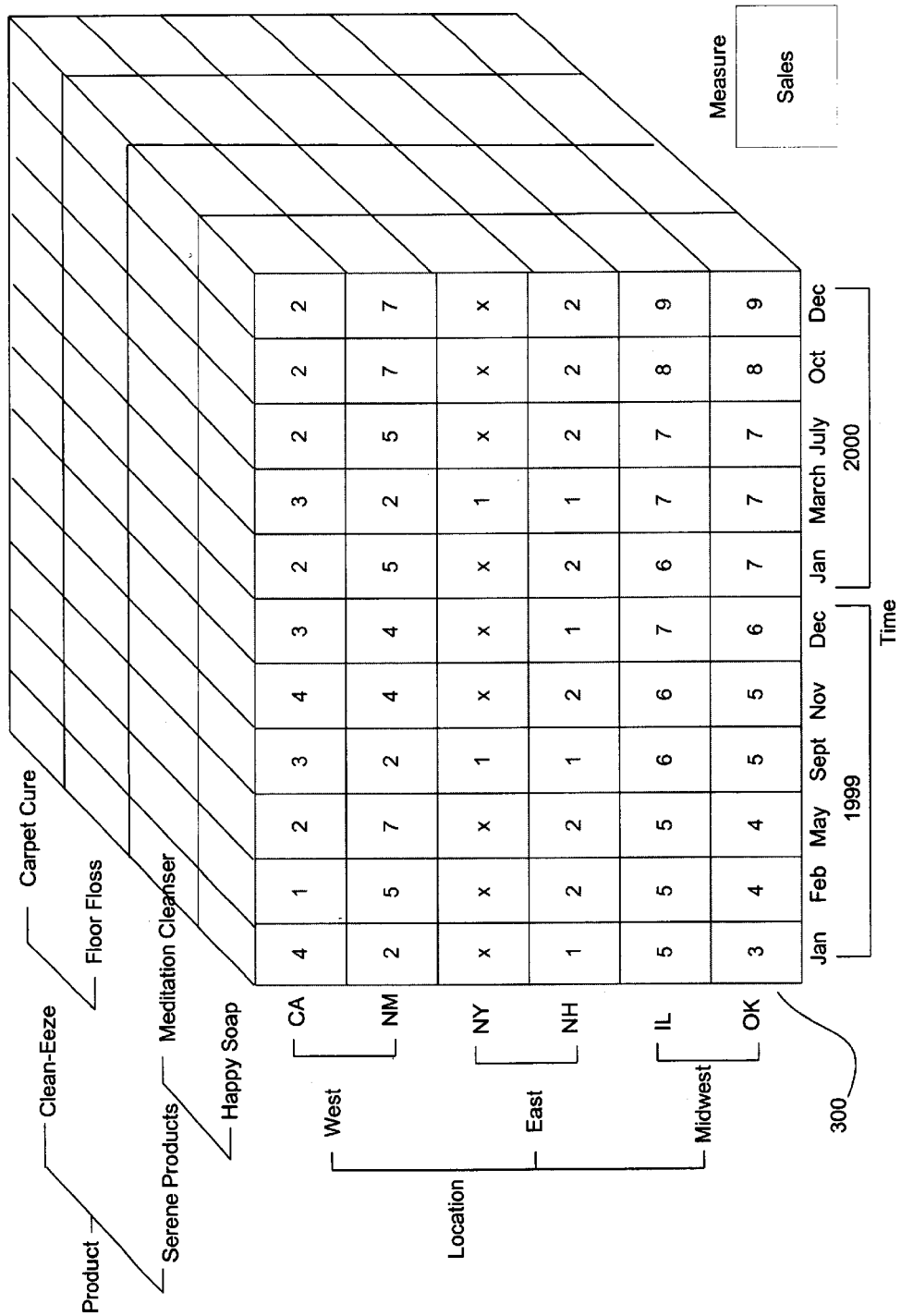
FIG. 2C shows data in an example of a database conceptualized as a cube and an associated addressing scheme in accordance with an embodiment of FIG. 2A.

FIG. 2C illustrates an example of data in the database 116 conceptualized as a cube and an associated hierarchical addressing scheme used to address the cube. The data in the database 116 derives its source data from schema 200. The cells contain the corresponding values of measure attributes. There can be any number of measures. Each cell has an address, called a canonical address, as discussed below. The number of dimensions determines the number of components in the canonical address. Some cells may have values, but are shown only for those cells in the foreground for ease of explanation. As shown in FIG. 2C, cells marked with 'X' have no values. Alphanumeric values are the members of the dimensions. Example members are: Jan, NH, and West. The following canonical address <Time. 1999. Jan, Loc. Midwest.IL, Measure.*> identifies a cell in which the value is <5>. A region of related data, called a cubelet, is identified by a cubelet address. Cubelets and their cubelet addresses are described in more detail below in connection with FIGS. 5A–5D.

Figure 3:
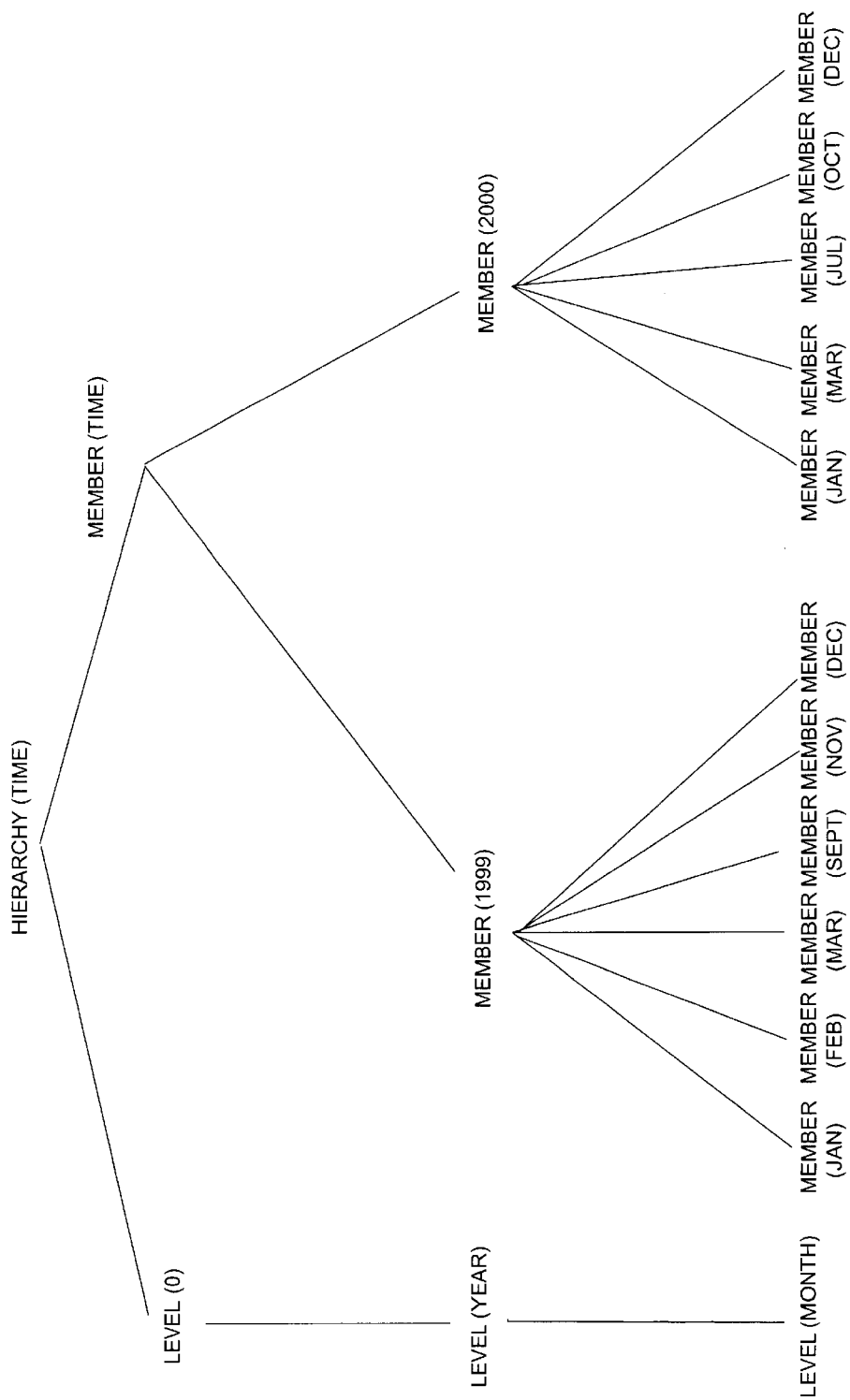
FIG. 3 illustrates a time dimension structure in a meta data structure in accordance with a described embodiment of the present invention.

FIG. 3 illustrates time dimension structure 300 in the meta data structure 106 of FIG. 1. This data structure is used to convert a query into a set of cubelet addresses and canonical addresses. The time dimension structure 300 is represented by three classes: hierarchy, level and member. Hierarchy contains the ordered set of levels and a tree of dimension members. The time dimension structure 300 has two levels: Year and Month, and contains the following members:

```
{   Time,
    Time.1999,
    Time.2000,
    Time.1999.Jan,
    Time.1999.Feb,
    Time.1999.Mar,
    Time.1999.Sept,
    Time.1999.Nov,
    Time.1999.Dec,
    Time.2000.Jan,
    Time.2000.Mar,
    Time.2000.July,
    Time.2000.Oct,
    Time.2000.Dec
}
```

Levels represent a set of members in a dimension structure such that all members of the set are at the same distance from a root of the structure. The root is the top-most level in a hierarchy. The root of the dimension structure 300 is defined by the name of the Hierarchy, Time. A level has a set of pointers to the members at its level. For example, level 'Month' has a set of pointers (not shown) to the following members: '1999.Jan', '1999.Feb', '1999.Mar', '1999.Sept', '1999.Nov', and '1999.Dec.' Similarly, 'Month' maintains a set of pointers (not shown) to the following members: '2000.Jan', '2000.Mar', '2000.Jul', '2000.Oct', and '2000.Dec.' The parent of a member is located at the level immediately above of that member in a dimension structure. A child of a member is located at a level below of that member. Members of the same parent are siblings. Each member has pointers to its parent, level, next sibling and first child. For example, member '1999.Jan' maintains a pointer to its parent, 'Time.1999', to its level 'Month' (pointer is not shown), to its next sibling '1999.Feb' and to its first child (not shown): 'Time.1999.Jan 1'.

Member 'Time.1999.Jan' is a sibling of the member 'Time.1999.Sept' because they are children of the same parent, 'Time.1999.' Member 'Time.1999.Jan', however, is not a sibling of members 'Time.2000.Jan', 'Time.2000.Mar', etc. because they have different parents, 'Time.1999' and 'Time.2000.'

Figure 4:
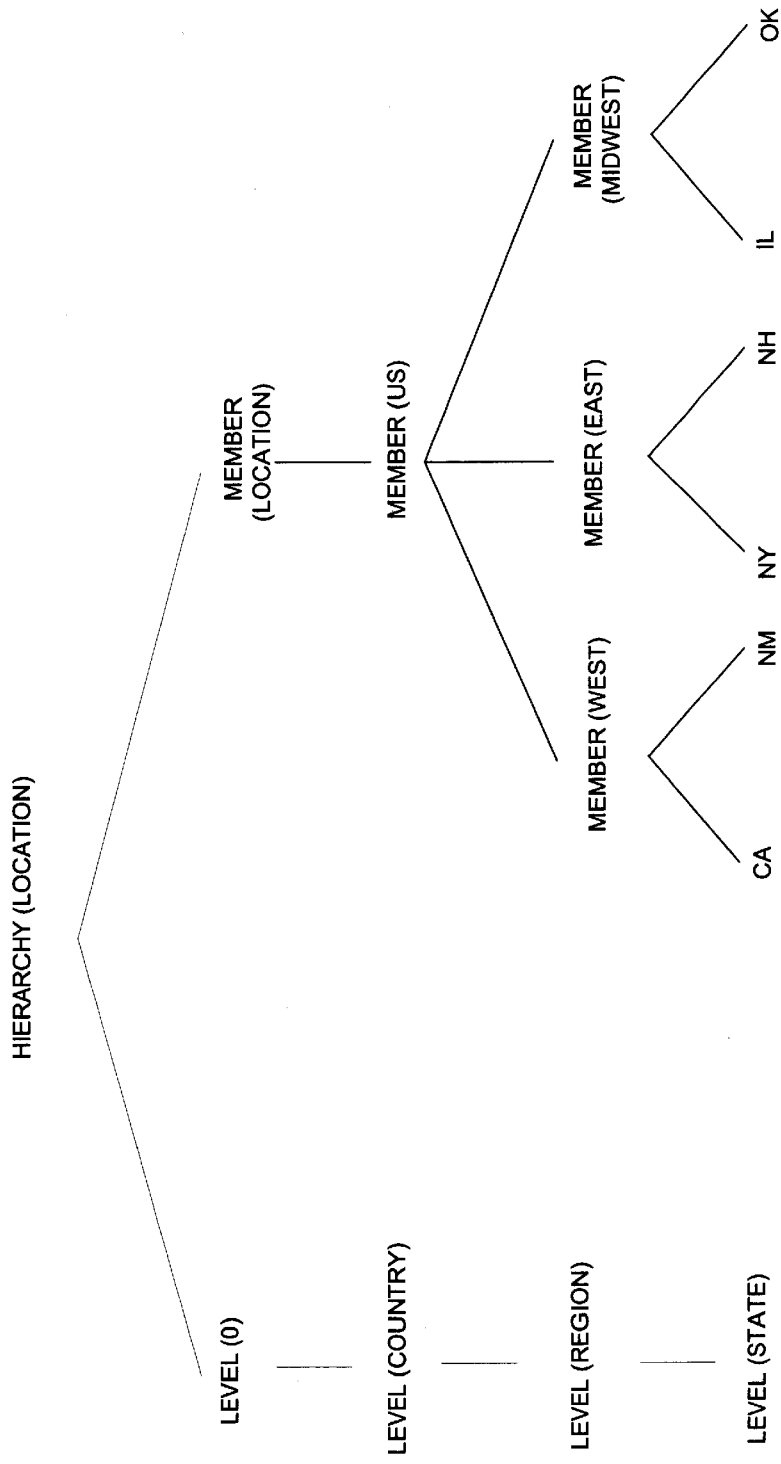
FIG. 4 illustrates a location dimension structure in the meta data structure in accordance with a described embodiment of the present invention.

FIG. 4 illustrates the Location dimension structure 400 stored in the meta data structure 106 of FIG. 1. This data structure is used to convert a query into a set of cubelet addresses and canonical addresses. The location dimension structure 400 has two levels: Country and Region. Location dimension structure 400 contains the following members:

```
{
Loc,
Loc. US,
Loc. US.West,
Loc. US.East,
Loc. US.Midwest,
Loc. US.West.CA,
Loc. US.West.NM,
Loc. US.East.NY,
Loc. US.East.NH,
Loc. US.Midwest.IL,
Loc. US.Midwest.OK
}
```

The root of the member tree is defined by the name of the Hierarchy, Location. Level 'Region' has a pointer (not shown) to East, West and Midwest. Each member in the dimension structure 400 refers to its parent, level, next sibling and first child. For example, 'Midwest' has a pointer to its parent 'US', its level 'Region' (pointer is not shown), its next sibling 'East' (pointer is not shown), and its first child 'IL'.Members 'East' and 'West' are siblings of 'Midwest'.Members 'West.CA' and 'West.NM' are siblings and maintain pointers to their parent 'Loc.West.' Similarly, 'East.NY' and 'East.NM' are siblings and maintain pointers to their parent Loc.East. Members 'Loc.Midwest.IL' and 'Loc.Midwest.OK' are siblings and maintain pointers to their parent 'Loc.Midwest.'

In a preferred embodiment, the meta data structure 106 also stores a Product dimension structure (not shown in the figures). Product dimension structure includes the following members:

```
{
Product,
Product. Clean-Eeze,
Product. Serene Products,
Product. Clean-Eeze.SuperScruby,
Product. Clean-Eeze.Floor Floss,
Product. Clean-Eeze.Carpet Cure,
Product. Serene Products.Happy Soap,
Product. Serene Products.Meditation Cleanser
}
```

It should be noted that the meta data structure 106 may store any number of dimension structures reflecting a logical organization of the multi-dimensional, multi-level database 116.

Referring again to FIG. 1, the following example illustrates a method performed by the embodiment of FIG. 1. The cube manager module 104 receives a an MDX query from a user to fetch data. As an illustrative example, a request is in the form of the following MDX query:

```
Select {CA, OK} on columns,
    {1999, 2000} on rows
From cube
Where (Measures.Sales, Product.Serene Products.Happy Soap).
```

A 'SELECT' clause is used to select the members to be returned, referred to as an axis specifications. The 'WHERE' clause is used to restrict the returned data to otherwise unrestricted dimensions, referred to as slicer dimensions. Generally, there are multiple members from different dimensions in axis specifications. Thus, in the sample query, 'CA', 'OK', '1999', and '2000' appear in axis specifications. It should be noted that if a member appears in the axis specifications, that member and its sibling members are part of the same cubelet containing the query result. In contrast, the 'WHERE' clause slicers are single members. In the sample query, 'Happy Soap' appears in the slicer specification. If a member appears in the slicer, siblings of that member are not part of the cubelet containing the query result.

The cube manager module 104 forwards the query to the compilation module 108. The output of the parsing phase is a parse tree representing the query. Semantic validation of the parse tree yields a list of all values that will appear on each of the axes. The semantic validation phase uses the dimension structures 300 and 400 and the Product dimension structure to resolve possibly qualified member names. The result of a resolution is the name of a dimension (i.e., the root of the dimensional hierarchy), a member within a hierarchy, or the name of a level. Level names may only appear as the argument to an enumeration function. For example, the specification 'Location.Region.members' yields all the members at the Region level, i.e. 'West', 'East' and 'Midwest'.

In an alternative embodiment, the compilation module 108 accepts a template query, which defines exactly which members from which dimensions are requested. The compilation module 108 validates the members in the template query.

The output of this step is a grid with resultant axes (Loc.West.CA, Loc.Midwest.OK), (Time.1999, Time.2000) and slicers (Measure.Sales, Happy Soap) and the location of the requested data in the result set ((0,0), (0,1), (1,0), (1,1)).

TABLE 1

Grid generated by the compilation module

| Period | Loc. West. CA | Loc. Midwest. OK |
|---|---|---|
| Time. 1999 | Measure. Sales, Happy Soap (0,0) | Measure. Sales, Happy Soap (0,1) |
| Time. 2000 | Measure. Sales, Happy Soap (1,0) | Measure. Sales, Happy Soap (1,1) |

The plan generator 118 computes the cross join of the values on axes and slicers, producing the following set (A) of canonical addresses and their location in the final result set ('SP' is an abbreviation for 'Serene Products'):

| | |
|---|---|
| <Loc.West.CA, Time.1999, Product.SP.Happy Soap, Measure.Sales> | (0,0) |
| <Loc.West.CA, Time.2000, Product.SP.Happy Soap, Measure.Sales> | (1,0) |
| <Loc.Midwest.OK, Time.1999, Product.SP.Happy Soap, Measure.Sales> | (0,1) |
| <Loc.Midwest.OK, Time.2000, Product.SP.Happy Soap, Measure.Sales> | (1,1) |

Set (A) represents all the points in the data cache 113 that need to be examined in order to answer the query. As discussed above in connection with FIG. 2C, a region of related data (cubelet) in a cube is identified by a cubelet address. The plan generator 118 computes a cubelet address for each canonical address in the set. The cubelet address includes the two components: a parent of each member in each canonical address and an indication whether the member appears in the axis or slicer dimension in the query. Note that cubelet addresses do not contain the Measure dimension. The Measure dimension only appears in the canonical address. Thus, for the canonical address <Loc.West.CA, Time.1999, Product.SP.Happy Soap, Measure.Sales> the plan generator 118 generates the following cubelet address {Loc.West.*, Time.*, Product.SP.Happy Soap}.In this cubelet address, 'Loc.West' is the parent of 'CA' and 'Time' is the parent of '1999'. Because members 'CA' and '2000' appear in the axis specification (as indicated in the 'SELECT' clause in the query), '*' in the cubelet address indicated that all children of the 'Loc.West' (CA and NM) and 'Time' (1999 and 2000) will be selected for caching. Because 'Happy Soap' appears in the 'WHERE' clause in the query, the plan generator 118 determines that 'Happy Soap' appears in the slicer. As a result, only the member 'Happy Soap', but not its siblings, will be selected for caching.

Similarly, for the canonical address <Loc.West.CA, Time.2000, Product. SP.Happy Soap, Measure.Sales> the plan generator 118 computes the following cubelet address {Loc.West.*, Time.*, Product.SP.Happy Soap}. In this cubelet address, 'Loc.West' is the parent of 'CA' and 'Time' is the parent of '2000'; '*' indicates that 'CA', and '2000' appear in the axis dimension in the query. Therefore, all children of 'Loc.West' and 'Time' will be selected for caching. It should be noted that the first two canonical addresses in the set (A) have the same cubelet address. This indicates that values for a measure attribute Sales identified by these canonical addresses are stored in the same cubelet.

The plan generator 118 also generates cubelet addresses for canonical addresses <Loc.Midwest.OK, Time.1999, Product.SP.Happy Soap, Measure.Sales> and <Loc.Midwest.OK, Time.2000, Product.SP.Happy Soap, Measure.Sales>. This cubelet address for both canonical addresses is the cubelet {Loc.Midwest.*, Time.*, Product.SP.Happy Soap}. This indicates that values for a measure attribute Sales identified by these canonical addresses are stored in the same cubelet. The following cubelet addresses: {Loc.West.*, Time.*, Product.SP.Happy Soap} and {Loc.Midwest.*, Time.*, Product.SP.Happy Soap} form a set of cubelet addresses (B). The set (A) of canonical addresses, the set (B) of cubelet addresses, and the location of the values in the result set comprise the major components of an execution plan.

The execution module 110 receives the execution plan. For each of the entries in the query plan's list of cubelet addresses, the execution module 110 probes the data cache 113 to determine if that portion of the cube is known. For example, the execution module 110 determines if a cubelet identified by the cubelet address {Loc.West.*, Time.*, Product.SP.Happy Soap} has been cached.

If the cubelet is already cached, the execution module 110 returns the cubelet identified by the cubelet address. This cubelet includes the values of the measure attribute Sales having the following canonical addresses:

| | |
|---|---|
| <CA, 1999, Happy Soap, Measures.*> | = <17> |
| <CA, 2000, Happy Soap, Measures.*> | = <11> |
| <NM, 1999, Happy Soap, Measures.*> | = <24> |
| <NM, 2000, Happy Soap, Measures.*> | = <26> |

The execution module 110 then probes this cubelet for the two canonical addresses (listed in the execution plan): <CA, 1999, Happy Soap, Sales> and <CA, 2000, Happy Soap, Sales>. The execution module 110 extracts values 17 and 11 corresponding to the canonical addresses and places them in the final result set in the locations (0,0) and (1,0) indicated in the execution plan.

If the data is not found in the data cache 113, the cube manager module 104 generates a miss and invokes the fault handler 114 to query the database 116 for data. The database 116 returns the cubelet associated with the cubelet address. This cubelet is stored in the data cache 113. This cubelet includes the requested data. It also contains the data for "nearby" cells. The requested data and the data for "nearby cells" are in the form of values of measure attributes and associated canonical addresses. The components of each canonical address for the cells containing the requested data include members that appear on axis specifications and slicers in the query. The components of each canonical address for "nearby cells" include members that appear on slicers and siblings of members that appear on axis specifications in the query, as shown in table 620 of FIG. 6.

Continuing with the example, the execution module 110 also determines whether the portion of the cube identified by the cubelet address {Loc.Midwest.*, Time.*, Product.SP.Happy Soap} is already stored in the data cache 113. If the cubelet is already cached, the execution module 110 returns a cubelet identified by the cubelet address. This cubelet includes the values of a measure attribute Sales having the following canonical addresses:

<IL, 1999, Happy Soap, Measures.*> = <34>
<IL, 2000, Happy Soap, Measures.*> = <37>
<OK, 1999, Happy Soap, Measures.*> = <27>
<OK, 2000, Happy Soap, Measures.*> = <38>

The execution module 110 then probes this cubelet for the two canonical addresses: <OK, 1999, Happy Soap, Sales> and <OK, 2000, Happy Soap, Sales>. The execution module 110 extracts values <27> and <38> corresponding to the canonical addresses and places them in the final result set in the locations (0,1) and (1,1) indicated in the execution plan.

If the data is not found in the data cache 113, the data cache module 113 generates a miss and invokes the fault handler 114 to query the database 116 for data. The database 116 returns a cubelet associated with the cubelet address. This cubelet is stored in the data cache 113. This cubelet includes the requested data. It also contains the data for "nearby" cells. The requested data and the data for "nearby cells" are in the form of values of measure attributes and associated canonical addresses. The components of each canonical address for the cells containing the requested data include members that appear on axis specifications and slicers in the query. The components of each canonical address for "nearby cells" include members that appear on slicers and siblings of members that appear on axis specifications in the query, as shown in table 630 of FIG. 6.

Figure 5B:
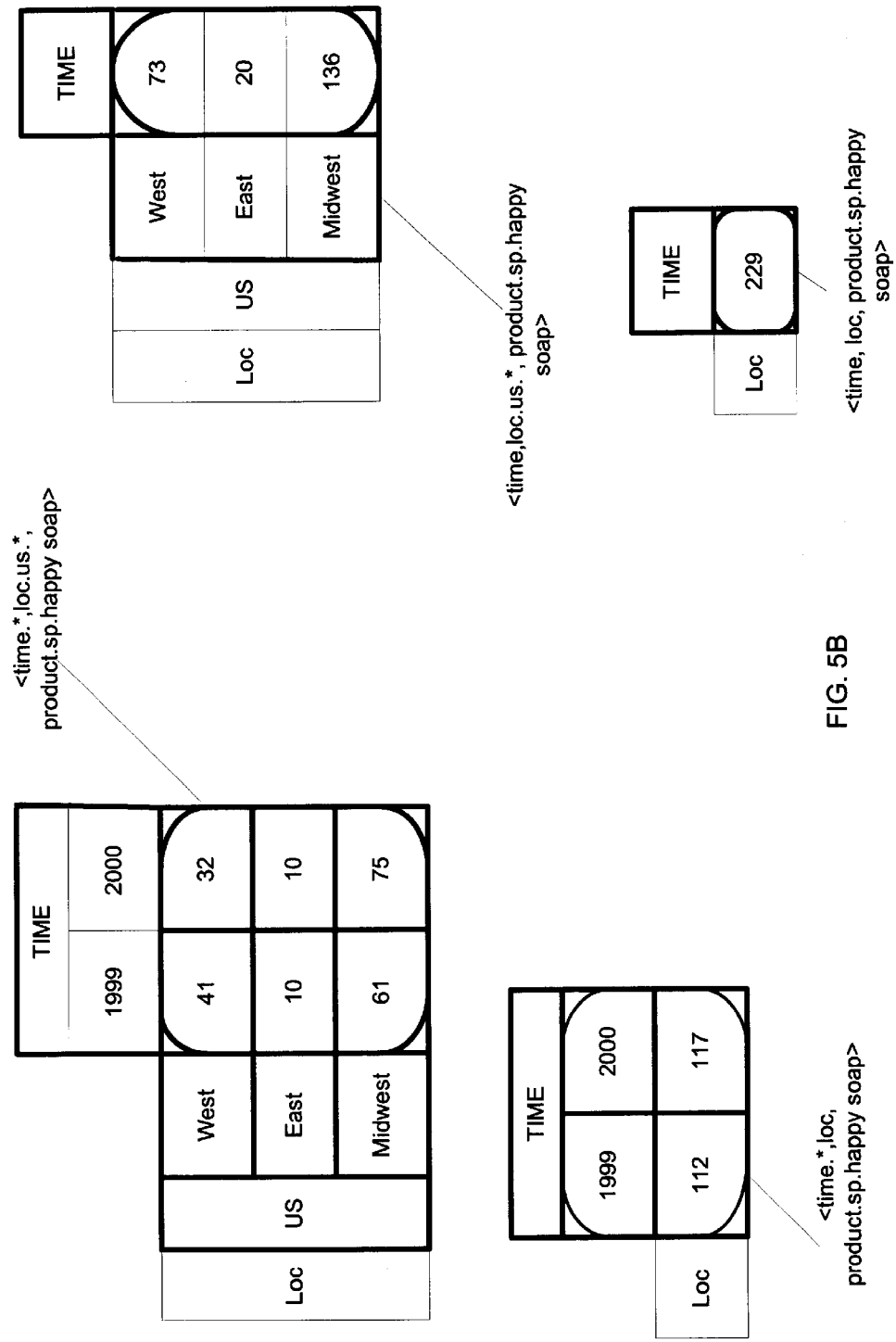

FIGS. 5A–5D are block diagrams of a set (lattice) of cubelets stored in the data cache 113. Data is cached at various levels, to facilitate the retrieval of data at different levels. Users can issue queries designed to return the whole cube or selected portions at different levels of detail. This type of operation is called drilling. Suppose a user issues a query to see Sales values of a Happy Soap product manufactured by Serene Products (SP) for 1999 in the West and East regions of the US. If the user queries this part of the cube, the user might next be interested in comparing Sales values for the years 1999 and 2000 in these regions as well is in Midwest of the US. The invention facilitates the inspection of related data by caching the entire cubelet containing the requested data. In response to the query for sales in 1999, the execution module 110 returns the Sales value of <41> for the Western Region and <32> for the Eastern Region in FIG. 5B. In addition, Sales data for Happy Soap for 1999 and 2000 in all the regions are stored in the data cache 113 for future use. As shown in FIG. 5B, this data is stored in a cubelet identified by the cubelet address {Time.*, Loc.US.*, Product.SP.Happy Soap}. Thus, the next time a user is interested in comparing Sales values for 1999 and 2000, the user can retrieve this information from the data cache 113 without re-accessing the database 116.

Figure 5C:
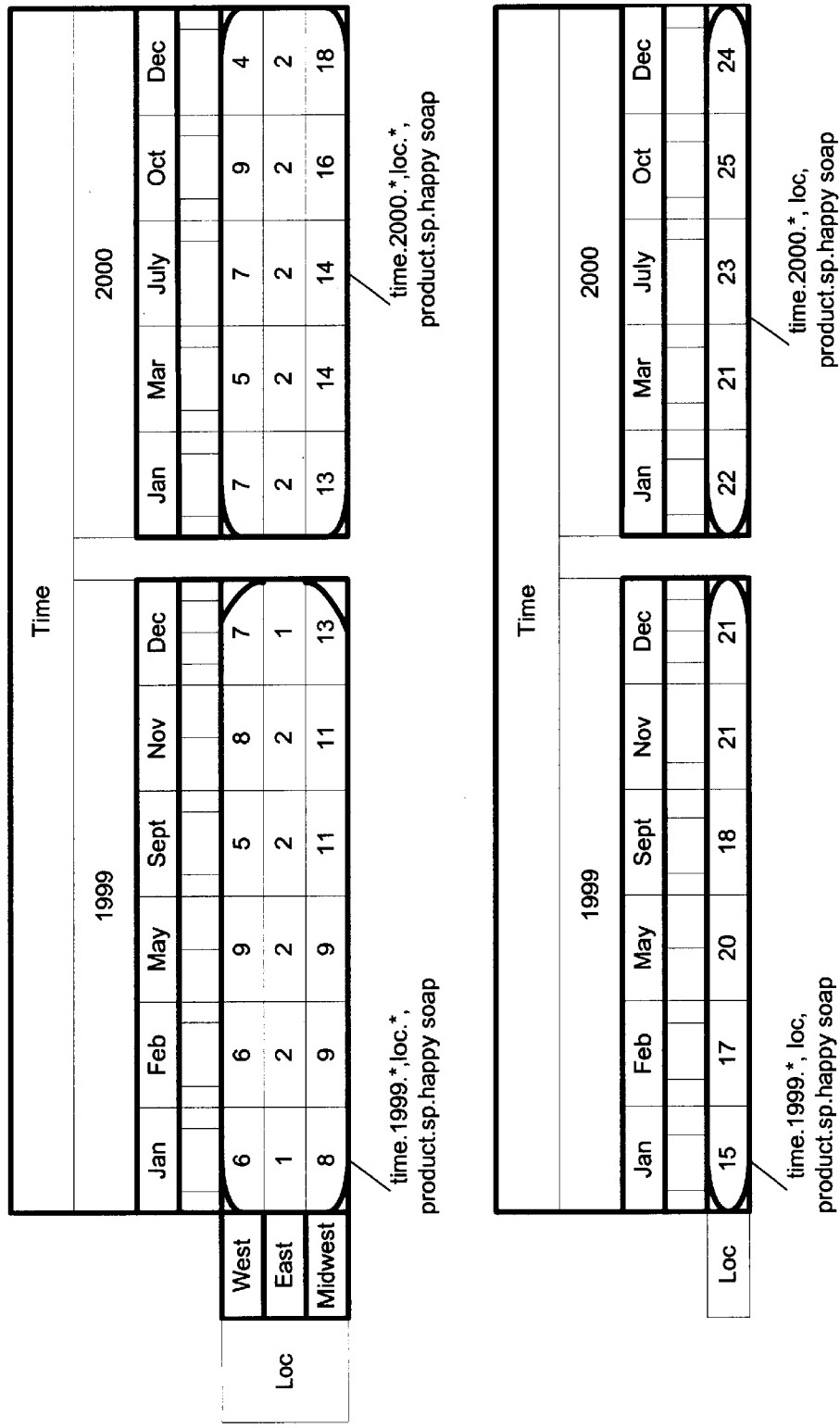

The user may notice that 2000 Sales values are higher than those in the year 1999. Expanding the Year dimension to the Month level, the user can query Sales values for a particular month, for example January, by drilling down on 'Time' dimension, as shown in FIG. 5C. Such a query would result in a cubelet of a lower dimension level (without aggregated month values) being cached.

Figure 6:
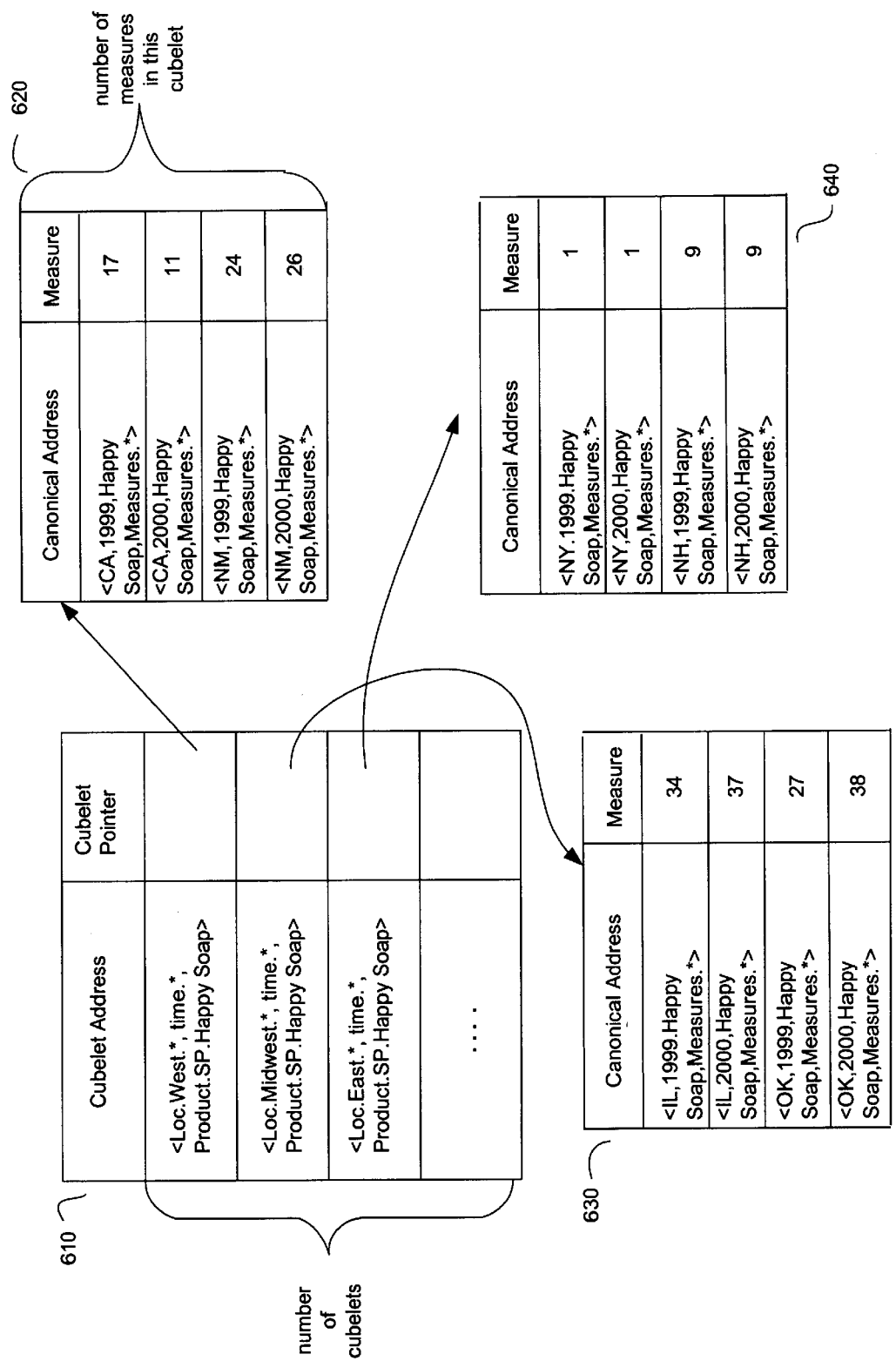
FIG. 6 is a block diagram of the data cache in accordance with a described embodiment of the present invention.

FIG. 6 is a block diagram of example tables in the data cache 113 in accordance with a described embodiment of the present invention. The data cache 113 manages the in-memory storage of query results. The data cache 113 stores pairs of (Cubelet Address, Cubelet Pointer) in a hash table. Similarly, the Cubelet stores pairs of (Canonical Address, Measures) in a hash table. Thus, the data cache 113 is a two-level hash table: first, by a cubelet address and then by a canonical address. As an illustrative example, the data cache 113 stores the following cubelet address in a hash table 610: {Loc.West.*, Time.*, Product.SP.Happy Soap}, where '*' refers to all the children of 'West' and 'Time'. This cubelet address identifies a cubelet that includes all the measures for Sales of 'Happy Soap' for all States in the Western region for all years. Specifically, hash table 620 stores measures identified by the following canonical addresses: <CA, 1999, Happy Soap, Measure.*>, <CA, 2000, Happy Soap, Measure.*>, <NM, 1999, Happy Soap, Measure.*>, <NM, 2000, Happy Soap, Measure.*>.

Hash table 610 also stores the cubelet address {Loc.Midwest.*, Time.*, Product.SP.Happy Soap}, where '*' refers to all the children of 'Midwest' and 'Time'. This cubelet address identifies a cubelet that includes all the measures for Sales of "Happy Soap" for all States in the Midwest region for all years. Specifically, a hash table 630 stores measures identified by the following canonical addresses: <IL, 1999, Happy Soap, Measure.*>, <IL, 2000, Happy Soap, Measure.*>, <OK, 1999, Happy Soap, Measure.*>, <OK, 2000, Happy Soap, Measure.*>.

Hash table 610 also stores the cubelet address {Loc.East.*, Time.*, Product.SP.Happy Soap}, where '*' refers to all the children of 'East' and 'Time'. This cubelet address identifies a cubelet that includes all the measures for Sales of 'Happy Soap' for all States in the East region for all years. Specifically, a hash table 640 stores measures identified by the following canonical addresses: <NY, 1999, Happy Soap, Measure.*>, <NY, 2000, Happy Soap, Measure.*>, <NH, 1999, Happy Soap, Measure.*>, <NH, 2000, Happy Soap, Measure.*>.

As discussed above, the execution module 110 first probes the data cache 113 to determine if the portion (cubelet) of the data cache 113 identified by a cubelet address is cached. If yes, the cubelet is returned from the data cache 113. This cubelet includes the requested data. It also contains the data for "nearby" cells. The requested data and the data for "nearby cells" are in the form of values of measure attributes and associated canonical addresses. The components of each canonical address for the cells containing the requested data include members that appear on axis specifications and slicers in the query. The components of each canonical address for "nearby cells" include members that appear on slicers and siblings of members that appear on axis specifications in the query. The execution module 110 then probes that cubelet for the canonical addresses received in the execution plan. The execution module 110 extracts the requested data and places it in the result set in locations indicated in the execution plan. It should be noted that the execution module 110 may return a cubelet containing no values.

Mathematical details of the Data Cache

Suppose we have an n dimensional cube that consists of dimensions $D_1, D_2, \ldots, D_n$. Each of these $D_i$ is a set of members that have a hierarchical relationship that satisfy the following properties for each D root(D) = d for one and only d ∈ D
parent(root(D)) = 0
For all x ∈ D, there exists one y such that parent(x) = y
Define (D$_i$, <) as a partial order on D$_i$ such that x < y → x is a child of y
Let d$_i$ be an element of D$_i$
Define children (d$_i$) as {x ∈ D$_i$|parent (x) = d$_i$)}
Define siblings (d$_i$) as {x ∈ D$_i$|parent (x) = parent (d$_i$)}
Define level(d$_i$) = distance from d$_i$ to the root of D$_i$ in the member tree of D$_i$.
Define the Level Set as: L$_{ij}$ = {x|x ∈ D$_i$ and level(x, D$_i$) = j}

The vector of a fully qualified member is formed as follows:

$$CA = \{<d_1, d_2, \ldots, d_n>|d_i \in D_i\}$$

There is one to one mapping between fully qualified member MDX queries and canonical addresses of every point in a cube.

Each component $c_i$ in c is a symbol of the form:

$$d_i = k_{i1} \cdot k_{i2} \cdot k_{i3} \cdot \ldots \cdot k_{im_i}$$

where $k_{ij} \in L_{ij}$ and $0 <= m_i <= \text{numLevels}(D_i)$

We allow a canonical address to have a null value in a given dimension even though MDX does not define a query that maps to such an address. This permits us to define the canonical address of the form <parent(d$_1$), parent(d$_2$), ..., parent(d$_n$)> for all MDX-generated addresses. Now we can rewrite c as $$c = <d_1, d_2, \ldots, d_n> = <k_{I1} \cdot k_{I2} \cdot k_{I3} \ldots \cdot k_{1m_1}, k_{21} \cdot k_{22} \cdot k_{23} \cdot \ldots \cdot k_{im_2}, \ldots 2, k_{n1} \cdot k_{n2} \cdot k_{n3} \cdot \ldots \cdot k_{im_n}>$$

Caching pairs of (c, m) would result in a large number of single measure queries against database 116. The present invention offers a meaningful way to group canonical addresses that allows for query optimization. The canonical addresses are grouped into a cubelet. For a given canonical address d=<d$_1$, d$_2$, ..., d$_n$>∈CA, there is $K_d$=FullCubelet(<d$_1$, d$_2$, ..., d$_n$ >)=children(d$_1$)⊗ children(d$_2$)

⊗ ... ⊗ children(d$_n$)

={<d$_1$·a$_1$, d$_2$

·a$_2$, ..., d$_n$·a$_n$>

|d$_i$·a$_i$∈D$_i$ and parent(d$_i$·a$_i$)=d$_i$}

A FullCubelet has the property that all of its elements have the same parent member in each of its dimensions.

Queries will generally choose a small number of dimensions to go into the axis (row/column) specifications. The FullCubelet will retrieve siblings on slicer dimensions that the user might not be interested in. The present invention introduces a PartialCubelet, which will retrieve siblings on slicer dimensions that are part of the axis specifications. We define a PartialCubelet as follows:

Define AxisVector(d) or av(d) as

Mapping <d$_1$, d$_2$, ..., d$_n$> to <a$_1$, a$_2$, ..., a$_n$> such that a$_i$=d$_i$ if d$_i$ is on the axis specifications of the query. Otherwise, a$_{i=0}$.

Define SliceVector(d) or sv(d) as

Mapping <d$_1$, d$_2$, ..., d$_n$> to <S$_1$, S$_2$, ..., S$_n$> such that s$_i$=d$_i$ if d$_i$ is a slicer dimension. Otherwise, s$_{i=0}$.

For a given canonical address d=<d$_1$, d$_2$, ..., d$_n$>∈CA there is a Partial Cubelet, $P_d$=PartialCubelet(d)=FullCubelet(AxisVector(d)+SlicerVector(d)=
{<p$_1$, p$_2$, ..., p$_n$>|p$_i$∈children(d$_i$) if d$_i$∈AxisVector(d), d$_i$ otherwise}

This optimization allows users to populate all the measures in the PartialCubelet with a single query. This approach only incurs the additional result storage overhead for axis dimensions. This pattern of storage makes the caching more efficient.

The present invention advantageously allows drilling down and up on axis dimensions. Suppose a $P_d$=PartialCubelet(<d$_1$, d$_2$, ..., d$_n$>) and suppose that <c$_1$, c$_2$, ..., c$_n$>∈$P_d$ is a member of a result set on which a user wishes to drill up or drill down.

Suppose that the user chooses to drill down on some $c_i$ that is an axis dimension. This would result in fetching Cubelet(d$_1$, d$_2$, ..., d$_n$), which is a superset of c$_1$, c$_2$, ..., children(c$_i$), ..., c$_n$>. This cubelet will also let the user to drill down along $c_i$ for any other member of $P_d$ of the form <c$_1$', c$_2$', ..., c$_i$, ..., c$_n$'> without need for re-query. Thus, the present invention advantageously allows the user to obtain the results of a particular member drill down across all other elements of a result set with a single re-query.

Suppose the user chooses to drill up on $c_i$.

This results in fetching Cubelet(d$_1$, d$_2$, ..., parent(d$_i$), ..., d$_n$>, which is a superset of <c$_1$, c$_2$, ..., d$_i$, ..., c$_n$> and a superset of <c$_1$, c$_2$, ..., siblings(d$_i$), ..., d$_n$>. This cubelet will let users also drill down along $c_i$ for any other member of $P_d$ of the form <c$_1$', c$_2$', ..., c$_i$, ..., c$_n$'> without need for re-query. The data cache 113 insures that a given pair (Canonical Address, measure) will exist in at most one cubelet at a given time to avoid replication of data.

Alternative Embodiments

In an alternative embodiment, the user will be able to specify both a hard cache limit and soft cache limit of the data cache 113 to implement size/memory constraints. Both parameters are expressed in terms of the number of measures stored in the data cache 113. If the hard cache parameter is specified, the data cache 113 ensures that it never exceeds the hard cache limit. The data cache 113 is allowed to exceed the soft cache limit by one cubelet of information. This permits the data cache 113 to handle a large number of requests in a densely populated cubelet containing detailed information. Using the soft cache limit advantageously allows the data cache 113 to handle an enormous number of queries.

To minimize the number of requests to the database 116, the present invention maintains a cubelet heap that will prioritize which cubelet will be returned from the data cache 113 when it is necessary to free up cache space. The final priority function will be determined based on experimentation. The initial priority function is preferably a combination of Least Recently Used (LRU), the number of results in the cubelet, and the estimated detail level of the cubelet. The estimated detail level is preferably used because summary queries (those closer to the root of dimensional hierarchies) are generally more costly to the database than detail queries (those closer to the members of the dimensional hierarchy). The estimated detail level will be calculated from the cubelet address by calculating the distance of each of its components from the root of its member tree and applying the Euclidian distance formula to it. That is: Suppose we have a cubelet address $<c_1, c_2, \ldots, c_n>$. Then we calculate $d= \sqrt{dist(c_1)^2 + dist(c_2)^2 + \ldots + dist(c_n)^2}$ where $dist(c_i)$ is the distance of member $c_i$ from the root of its member tree.

From the above descriptions, it will be apparent that the present invention disclosed herein provides a novel and advantageous method, system, and a computer program product for retrieving and caching multi-dimensional data. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims and equivalents.

What is claimed is:

1. A system for caching multi-dimensional data from a data store, the system comprising:
   a cube manager module for receiving a query requesting the data from the data store;
   a compilation module, coupled to the cube manager module, for determining a set of canonical addresses from the query and a set of cubelet addresses from at least one of the set of canonical addresses;
   a data cache for storing at least one cubelet including the requested data and data for nearby cells, the cubelet identified by at least one of the set of cubelet addresses; and
   an execution module, coupled to the compilation module, for requesting the data from the data cache in accordance with the at least one of the set of cubelet addresses.

2. The system of claim 1, wherein the data store is a multidimensional database.

3. The system of claim 1, wherein the data store is a relational database.

4. The system of claim 3, further comprising a meta data structure for representing at least one dimension structure of the data store.

5. A computer-implemented method comprising:
   receiving a query requesting data from a data store;
   determining a set of canonical addresses from the query and a set of cubelet addresses from at least one of the set of canonical addresses, each canonical address representing a vector of members in the data store corresponding to the requested data, and each cubelet address representing a cubelet that includes the requested data and data for nearby cells;
   when the cubelet is stored, returning the cubelet.

6. The computer-implemented method of claim 5, wherein the query includes members on axis and slicers specifications and wherein each nearby cell has a canonical address, the components of each canonical address include the members that appear on slicer specifications and siblings of the members that appear on axis specifications in the query.

7. The computer-implemented method of claim 5, further comprising:
   using at least one of the set of canonical addresses to locate the requested data in the returned cubelet.

8. A computer-implemented method, comprising:
   receiving a query requesting data from a data store;
   determining a set of canonical addresses from the query and a set of cubelet addresses from at least one of the set of canonical addresses, each canonical address representing a vector of members in the data store corresponding to the requested data, and each cubelet address representing a cubelet;
   using at least one of the set of cubelet addresses to determine whether a data cache stores the corresponding cubelet;
   when the cubelet is not stored in the data cache, retrieving from the data store a cubelet indicated by the cubelet address determined from the query; and
   storing the retrieved cubelet in the data cache.

9. The method of claim 8, wherein the query includes members on axis and slicer specifications and wherein the cubelet includes the requested data and data for nearby cells, each nearby cell having a canonical address, the components of each canonical address include the members that appear on slicers and siblings of the members that appear on axis specifications in the query.

10. A computer-implemented method comprising:
    receiving a query requesting data from a data store;
    determining a set of canonical addresses from the query and a set of cubelet addresses from at least one of the set of canonical addresses, each canonical address representing a vector of members in the data store corresponding to the requested data, and each cubelet address representing a cubelet in the data store;
    using at least one of the set of cubelet addresses to determine whether a data cache stores the corresponding cubelet;
    when the cubelet is stored, returning the cubelet from the data cache; and
    using at least one of the set of canonical addresses to locate the requested data in the returned cubelet.

11. The method of claim 10, wherein the query includes members on axis and slicer specifications and wherein the cubelet includes the requested data and data for nearby cells, each nearby cell having a canonical address, the components of each canonical address include the members that appear on slicer specifications and siblings of the members that appear on axis specifications in the query.

12. A computer program product for caching multi-dimensional data, including program instructions on a computer-readable medium, the product comprising:
    a computer readable medium;
    a module stored on the medium for receiving a query requesting data from a data store;
    a module stored on the medium for determining a set of canonical addresses from the query and a set of cubelet addresses from at least one of the set of canonical addresses, each canonical address representing a vector of members in the data store corresponding to the requested data, and each cubelet address representing a cubelet that includes the requested data and data for nearby cells;
    a module stored on the medium for returning the cubelet when the cubelet is stored.

* * * * *